Feb. 14, 1956  J. W. STRAAYER  2,734,698
AIRPLANE CONTROL SURFACE AND JET DEFLECTOR ARRANGEMENT
Filed Jan. 11, 1954
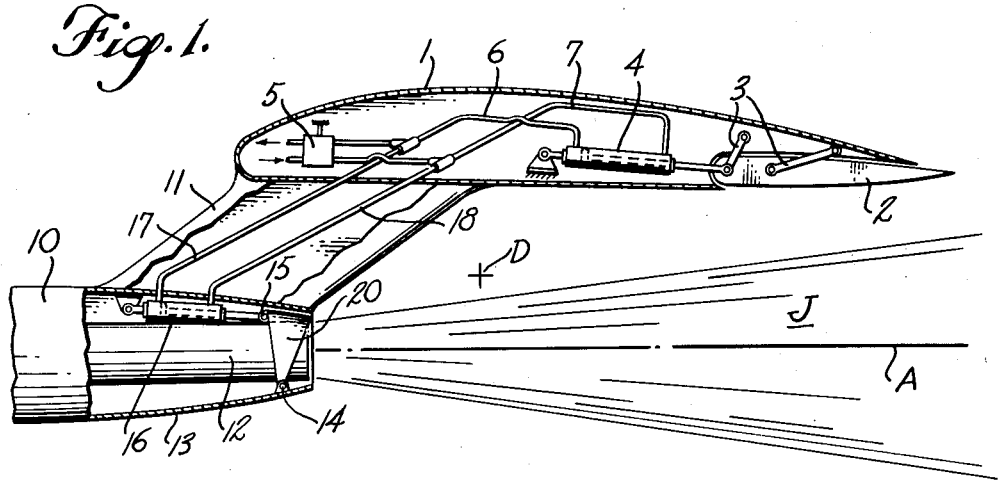
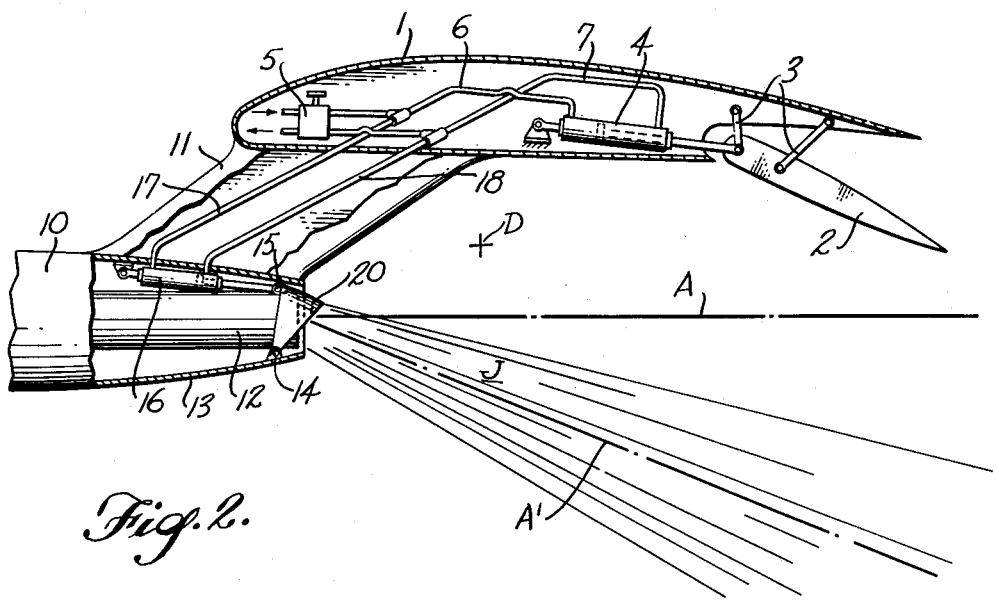
INVENTOR.
JOSEPH W. STRAAYER
BY
Reynolds, Beach & Christensen
ATTORNEYS

United States Patent Office 2,734,698
Patented Feb. 14, 1956

2,734,698

AIRPLANE CONTROL SURFACE AND JET DEFLECTOR ARRANGEMENT

Joseph W. Straayer, Birmingham, Mich., assignor to Boeing Airplane Company, Seattle, Wash., a corporation of Delaware Application January 11, 1954, Serial No. 403,370

3 Claims. (Cl. 244—15)

Jet engines for propulsion of airplanes are mounted according to one well-known design beneath and well forward of the trailing edge of the wing, indeed, projecting well ahead of the wing's leading edge. Such airplanes require a large area of lift-increasing flap, which are deflected downwardly from the wing's trailing edge when brought into use. Serious loss of lift augmentation would ensue, as well as other problems, were the flaps to be omitted in the portions which are immediately to the rear of the jet engines, yet the impingement of the extremely hot jet gases issuing from each engine's tailpipe on the downwardly deflected flaps is very likely to damage the flap structurally, and to cause aerodynamic and other problems. Nor is it feasible to locate the engines otherwise, nor to direct the jet in a direction other than towards the location which will be occupied by the flaps when they are deflected downwardly.

The present invention is directed to the solution of the particular problem outlined above, and aims primarily to insure against the impingement upon a flap (or other control surface, such as an aileron for example), when the surface is deflected downwardly to effect control, of the jet stream from an engine so located as to cause its jet to impinge otherwise upon such surface.

Of necessity, the jet engine must be located and supported reasonably close to a wing, for otherwise the moments created thereby about a local center of rotation would be unbalanced during normal flight and the aircraft would be subject to pitching or to excessive counteracting control surface displacement. According to the present invention, means are provided for automatically deflecting the jet downwardly, and so beneath a downwardly deflected control surface to the rear thereof, whenever such downward deflection of the control surface is required (as during landing, when the pilot is otherwise very busy), and thereby is accomplished a further object of the invention, namely to counteract automatically, in appreciable degree at least, any pitching moment caused by downward deflection of the control surface by a generally corresponding counter torque created by the downward deflection of the jet, but at the opposite side of the center of rotation of the local structure.

Still further, it is an object of this invention to provide simple mechanism whereby the jet is deflected downwardly as it issues from the rear of the jet engine's tailpipe coincident with and usually by the same control device as effects downward deflection of a control surface, such as a lift-increasing flap.

The invention is shown in the accompanying drawings largely in diagrammatic form and as applied to a typical installation.

Figure 1 is a chordal section through a wing and wing flap, and through the rear portion of the shroud or housing of a jet engine carried beneath the wing. All parts are shown in this view in normal flight position.

Figure 2 is a view similar to Figure 1, but showing the flap downwardly deflected into lift-increasing position and showing the jet deflector moved into position where it will deflect the jet downwardly beneath the downwardly deflected flap, and showing the operative connections to each from a common actuator, whereby their simultaneous actuation is automatically accomplished.

An airfoil is illustrated at 1 in the drawings, and this may be, and usually would be, a sustaining wing. In connection with such a wing, a lift-increasing flap 2 is supported at its trailing edge, and in normal flight position, shown in Figure 1, the flap 2 lies in general conformity with the contour of the wing 1. It is supported, however, by supporting elements 3 (and those shown are intended only to be typical of any suitable supports) by means of which it may be deflected downwardly and slightly rearwardly from its normal flight position, that of Figure 1, into a downwardly deflected lift-increasing position, such as is shown in Figure 2. As a means to accomplish such movement, there is illustrated a hydraulic jack or actuator 4 reacting from the wing and upon the flap, and controlled for movement into either position by a hydraulic control valve 5, and fluid lines 6 and 7. Again, this is intended as a purely typical or representative showing.

In a known design of airplane, a jet engine, generally represented at 10, is supported beneath and appreciably forwardly of the trailing edge of such a wing by means of a strut 11. The tailpipe 12 of such a jet engine is shrouded in by a streamlined shroud or housing as indicated at 13, and the position of the engine and its tailpipe are such that the jet J issuing from the tailpipe is directed rearwardly beneath the wing, along the axis indicated at A, but the hot gases of the jet do not impinge on any structural part of the wing during normal flight. Nevertheless, in order to eliminate the possibility of excessive pitching moments, the axis A of the jet J must be reasonably close to the wing and in the vicinity of its local center of rotation, which may be shown as arbitrarily located at a point as indicated at D. This is not necessarily the precise point, and the point will shift as the wing flexes, hence the point D is merely intended to represent a point such as can be located under transiently existing conditions, and which is somewhere in the vicinity of the arbitrarily located point D. In fact, the axis of the jet stream is so close beneath the wing 1 that downward deflection of the flap 2 into an effective lift-increasing position, as shown in Figure 2, would permit the jet to impinge upon the flap. Since the jet gases as they issue from the tailpipe are at an extremely high temperature, such impingement, especially if more than just momentary would severely damage the structure against which it impinges, and would create serious aerodynamic problems.

To prevent such impingement, means are provided to deflect the issuing jet downwardly along an axis A′ at such times. A jet deflector 20 is provided as one means of so doing. It is located in the vicinity of the rear end of the tailpipe 12, and is mounted for movement from a retracted position, such as that shown in Figure 1, wherein it is substantially withdrawn out of the jet J, into a position such as is shown in Figure 2, wherein it lies sufficiently within the path of the jet to deflect the jet downwardly along axis A′, and the jet as a whole will pass beneath the downwardly deflected flap 2. The precise form of the deflector and the manner of its mounting are largely immaterial. It may be, for example, pivotally mounted at 14, and connected at 15 to a hydraulic actuator 16, which is supported between the shroud 13 and the tailpipe 12, and this is a particularly desirable installation in view of the fact that the double-acting actuator 16 may be supplied with fluid through the conduits 17 and 18, which are branches of the conduits 6 and 7, respectively, and which are therefore controlled by the control valve 5 which is common to both actuators 4 and 16. As a result, whenever the flap is deflected downwardly by energizing its actuator 4, the deflector 20 is also and coincidentally depressed by energization of its actuator 16, and vice versa. The deflector, in its retracted or normal flight position, may be housed between the shroud 13 and the tailpipe 12, so that it does not interfere with the smooth stream-lined contour of the jet pod, nor yet with the issuing jet.

The airfoil has been described as a sustaining wing, but it will be evident that the airfoil might be instead a fixed horizontal tail surface, in which case the control surface 2 might be a movable horizontal control surface, or such surfaces might even be vertical tail surfaces. The essence of the present invention is that where a jet engine is necessarily mounted in such a location and position that its issuing jet is likely to impinge a movable control surface whenever the latter is necessarily swung aside from its normal flight position, the jet engine is provided with means whereby its jet may be deflected to an extent to avoid impingement upon the deflected control surface, and these jet-deflecting means are actuated in common with the actuation of the control surface so that the jet is automatically deflected to avoid impingement whenever the control surface must be so deflected. Also, the moments thus created by deflection of the control surface and of the jet are generally balanced one against the other, by reason of their location relative to the fixed surface whereon both the engine and the control surface are mounted.

I claim as my invention:

1. In an airplane, in combination with an airfoil, a control surface located at the trailing edge of said airfoil, means mounting said control surface for movement from a normal neutral position in general conformity with the contour of said airfoil into a controlling position deflected downwardly from the airfoil, a jet engine, means supporting said jet engine at a location beneath the airfoil and with the rear end of its tailpipe ahead of and sufficiently close to the control surface's location that the undeflected jet from the tailpipe would impinge the downwardly deflected control surface, a deflector movably mounted on said jet engine adjacent the tailpipe's rear end but normally substantially out of line with the jet from the tailpipe, and actuating means common to the control surface and to the deflector to move the deflector into position rearwardly of the tailpipe and such as will deflect the jet downwardly to clear the control surface, coincident with movement of the control surface into its downwardly deflected position.

2. The combination of claim 1, wherein the airfoil constitutes a sustaining wing and the control flap constitutes a lift-increasing flap.

3. In an airplane, in combination with an airfoil, a control surface, means mounting said control surface for movement from a neutral position in general conformity with the airfoil contour into a controlling position deflected from such contour, a jet engine, means supporting said jet engine at a location wherein, in normal flight, its tailpipe is ahead of and sufficiently close to the control surface's location that the jet from the tailpipe would impinge the control surface in a deflected position of the latter, means operatively connected to said jet engine to deflect its jet axis away from the deflected position of said control surface, and means common to the control surface and to said jet-deflecting means to effect movement of the latter for jet deflection coincidentally with movement of the control surface into a position wherein otherwise it would be impinged by the jet.

References Cited in the file of this patent

UNITED STATES PATENTS

| 2,086,545 | Fator | July 13, 1937 |
| 2,453,721 | Mercier | Nov. 16, 1948 |

FOREIGN PATENTS

| 655,089 | Great Britain | July 11, 1951 |